April 29, 1941.  S. EVANS  2,239,842
VALVE INDICATOR
Filed Dec. 1, 1938
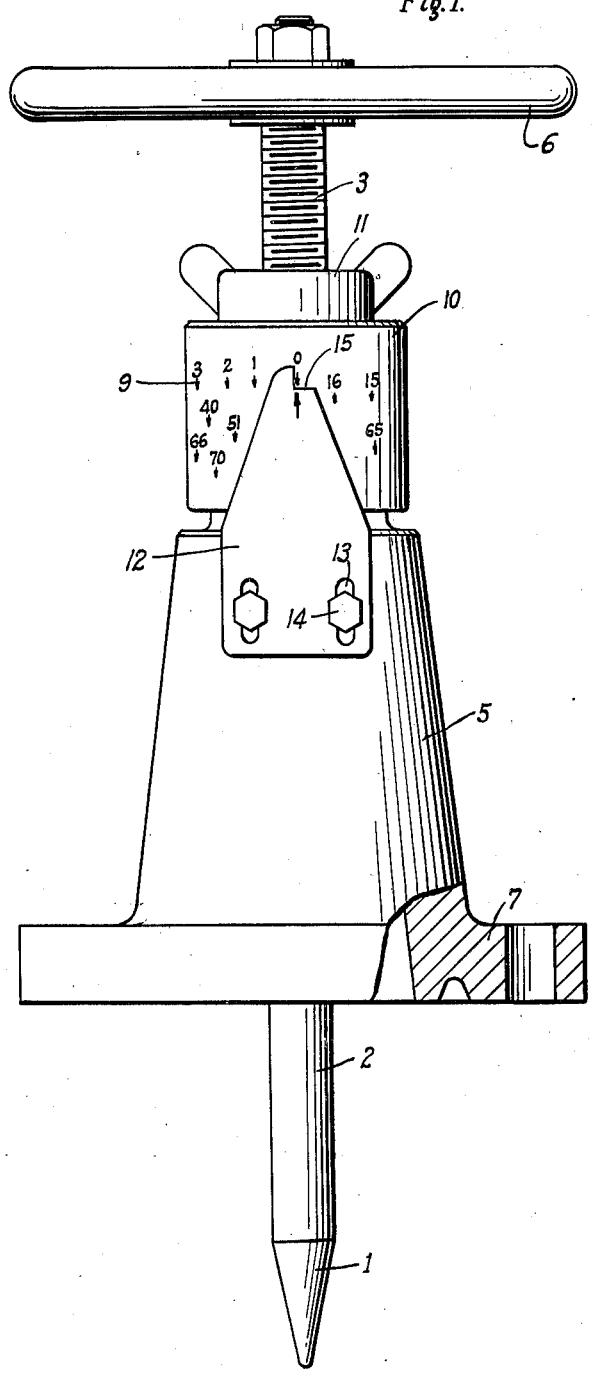
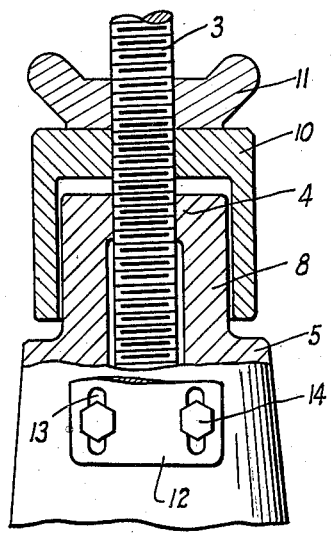
Seth Evans
INVENTOR
BY *Jesse R. Ston*
ATTORNEY Patented Apr. 29, 1941

2,239,842

UNITED STATES PATENT OFFICE 2,239,842

VALVE INDICATOR

Seth Evans, Houston, Tex., assignor to Hughes Tool Company, Houston, Tex., a corporation of Delaware Application December 1, 1938, Serial No. 243,317

4 Claims. (Cl. 116—125)

The invention relates to devices for indicating the position of a valve relative to a flow opening or orifice.

It is an object to provide an indicator for valves which is simple and strong in construction and particularly compact in its mounting upon the valve.

I desire that the indicator be formed so that it may be easily and quickly applied to the valve and that it take up but little space on the valve stem and bonnet.

It is a further object to make the indicator easily adjustable to fit any desired installation.

In the drawing Fig. 1 is a side elevation of a valve and valve bonnet with my invention mounted thereon.

Fig. 2 is a central vertical section of the indicator body shown mounted upon the valve stem.

I have illustrated my indicator as mounted upon the bonnet and stem of a needle type of valve such as is employed in regulating the amount of liquid passing through an orifice. It is, however, adapted for use upon various valve constructions. In this construction the valve 1 is shown as formed upon the forward end of a valve stem 2 which is threaded at 3 for screwing through the nut 4 which is shown as formed integrally upon the outer end of the valve bonnet 5. There is a handwheel 6 mounted upon the outer end of the valve stem in the usual manner.

The valve bonnet has a lower flanged end 7 for attachment to the body of the valve and the outer end is tapered outwardly. The nut 4 is formed upon a reduced cylindrical nipple 8 at the outer extremity of the bonnet.

The indicating scale is formed at 9 upon a cylindrical body 10. Said body is cap shaped and is of an internal diameter adapted to fit loosely over the nipple 8 on the bonnet. The body 10 is threaded to engage about the stem 3 of the valve so that it may be screwed along the valve stem to approximately the correct position thereon. There is a lock nut 11 on the stem for fixing the indicator body in set position.

To cooperate with the body 10, a pointer 12 is mounted adjustably upon the valve bonnet 5. Said pointer comprises a plate the lower end of which has therein a pair of elongated openings 13 through which the set screws 14 on the bonnet may extend. Thus the indicator pointer may be adjusted longitudinally of the scale 9 upon the body 10. The upper end of the pointer is tapered to a blunt point and a notch 15 is cut therein to provide a longitudinal shoulder to be aligned with the numerals upon the scale in reading the indicator.

Thus, when the valve is adjusted to and from its seat to regulate the flow of fluid, the operator will be able to observe, from the reading of the indicator, the position of the valve and determine how large an amount of fluid is flowing past the valve.

The advantage of the present construction is that it is strong and compact. The body of the indicator fits over the end of the valve bonnet. It may be made strong and durable so that it will not be easily broken or damaged. Also the adjustability of the pointer makes it easy to calibrate the device for use upon the valve. The scale may be first fixed in about the right position by screwing the body 10 along the valve stem. Then a finer adjustment may be accomplished by the movement of the pointer. Thus the device is capable of quick installation and accurate adjustment.

What I claim is:

1. In a valve having a valve bonnet, and a valve stem threaded therethrough, the combination of a cap shaped body fitting loosely over and enclosing about the upper end of said bonnet, said body being screwed upon said stem, means to fix said body non-rotatably upon said stem, a scale marked on said body, and a pointer on said bonnet adjustable longitudinally of said scale.

2. The combination of a valve bonnet, a reduced nipple at the upper end thereof, a valve stem fitting through said bonnet, a cap-shaped indicator body fitting loosely over said nipple and marked with a scale thereon, means to adjust said body along said valve stem, and a pointer mounted upon said bonnet so as to be adjusted longitudinally thereof and relative to said scale.

3. The combination of a valve bonnet, a reduced nipple at the upper end thereof, a valve stem fitting through said bonnet, a cap-shaped indicator body fitting loosely over said nipple and marked with a scale thereon, a threaded connection between said body, and said valve stem whereby said body may be screwed toward and from said nipple, a pointer comprising a plate fixed for longitudinal adjustment upon said valve bonnet and a tapered end thereon lying adjacent said body.

4. In a valve, a bonnet, a valve stem adjustable longitudinally through said bonnet, a cap-shaped indicator body fitting over the outer end of said bonnet, said body being threaded upon said stem, means to fix said body in adjusted position upon said stem, a spirally arranged scale on said body, a pointer on said bonnet and overlying said scale and means to adjust said pointer longitudinally upon said bonnet.

SETH EVANS.